US011178199B2

United States Patent
Nakagawa

(10) Patent No.: US 11,178,199 B2
(45) Date of Patent: Nov. 16, 2021

(54) INFORMATION DELIVERY APPARATUS, NON-TRANSITORY COMPUTER-READABLE STORAGE MEDIUM, INFORMATION DELIVERY SYSTEM, AND COMMUNICATION TERMINAL

(71) Applicant: Oki Electric Industry Co., Ltd., Tokyo (JP)

(72) Inventor: Satoshi Nakagawa, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 15/180,667

(22) Filed: Jun. 13, 2016

(65) Prior Publication Data

US 2017/0085610 A1    Mar. 23, 2017

(30) Foreign Application Priority Data

Sep. 17, 2015    (JP) .............................. JP2015-183909

(51) Int. Cl.
*H04L 29/06* (2006.01)
*H04L 12/18* (2006.01)
*H04L 29/12* (2006.01)

(52) U.S. Cl.
CPC .......... *H04L 65/4076* (2013.01); *H04L 12/18* (2013.01); *H04L 61/00* (2013.01)

(58) Field of Classification Search
CPC ...... H04L 65/4076; H04L 12/18; H04L 61/00
(Continued)

(56) References Cited

U.S. PATENT DOCUMENTS 9,450,772 B2 * 9/2016 Zhang ..................... H04W 4/08
9,503,276 B2 * 11/2016 Ng ....................... H04L 12/6418
(Continued)

FOREIGN PATENT DOCUMENTS

JP    2009-542117 A    11/2009
JP    2014006601 A    1/2014
(Continued)

OTHER PUBLICATIONS

Abhik Majumdar et al. "Multicast and Unicast Real-Time Video Streaming Over Wireless LANs", IEEE, pp. 524-532 (Year: 2002).*

*Primary Examiner* — Joseph L Greene
(74) *Attorney, Agent, or Firm* — Rabin & Berdo, P.C.

(57) ABSTRACT

Provided is an information delivery apparatus for distributing information to a plurality of communication terminals, the information delivery apparatus including: a terminal-information memory unit for storing terminal information of the plurality of communication terminals serving as information delivery destinations; an address-type-selection-information memory unit for storing address type selection information, which is for selecting an address type, for one network segment or each of a plurality of network segments; a transmission-address determination unit for determining address information to be applied based on the terminal information in the terminal-information memory unit and the address type selection information in the address-type-selection-information memory unit; and a transmission unit for transmitting the information by using the address information determined by the transmission-address determination unit.

12 Claims, 5 Drawing Sheets

(58) Field of Classification Search
USPC .......................................................... 709/219
See application file for complete search history.

(56) References Cited

U.S. PATENT DOCUMENTS

| | | | | |
|---|---|---|---|---|
| 2002/0194303 A1* | 12/2002 | Suila | .................... | G06Q 20/343 |
| | | | | 709/218 |
| 2010/0211689 A1* | 8/2010 | Bijwaard | ........... | H04N 21/6405 |
| | | | | 709/228 |
| 2013/0007814 A1* | 1/2013 | Cherian | ................ | H04L 65/605 |
| | | | | 725/62 |
| 2013/0305320 A1* | 11/2013 | Warrick | ................ | H04L 61/103 |
| | | | | 726/4 |
| 2014/0201323 A1* | 7/2014 | Fall | ......................... | H04L 67/10 |
| | | | | 709/217 |
| 2014/0219091 A1* | 8/2014 | Hellhake | ................. | H04L 47/14 |
| | | | | 370/235 |
| 2014/0282777 A1* | 9/2014 | Gonder | ............ | H04N 21/64322 |
| | | | | 725/109 |
| 2015/0134724 A1* | 5/2015 | Hao | ........................ | H04L 65/60 |
| | | | | 709/203 |
| 2015/0207860 A1 | 7/2015 | Kan et al. | | |
| 2017/0070428 A1* | 3/2017 | Ng | ........................ | H04L 69/324 |

FOREIGN PATENT DOCUMENTS

| | | | |
|---|---|---|---|
| JP | 2014131156 A | 7/2014 | |
| WO | WO-2007/149821 A2 | 12/2007 | |
| WO | 2014024545 A1 | 2/2014 | |

\* cited by examiner

FIG. 4

| SEGMENT No. | BROADCAST ADDRESS/NETMASK | THRESHOLD VALUE |
|---|---|---|
| 1 | xx. xx. xx. 255/24 | 3 |
| 2 | yy. yy. yy. 255/24 | 3 |
| ... | ... | ... |

INFORMATION DELIVERY APPARATUS, NON-TRANSITORY COMPUTER-READABLE STORAGE MEDIUM, INFORMATION DELIVERY SYSTEM, AND COMMUNICATION TERMINAL

CROSS REFERENCE TO RELATED APPLICATION(S)

This application is based upon and claims benefit of priority from Japanese Patent Application No. 2015-183909, filed on Sep. 17, 2015, the entire contents of which are incorporated herein by reference.

BACKGROUND

The present invention relates to information delivery apparatuses, non-transitory computer-readable storage medium, information delivery systems, and communication terminals, and can be applied to, for example, an information delivery system that distributes multimedia data including, for example, video information and audio information to a plurality of user terminals.

With the development of information communication technology in recent years, a technology in which users located at remote places communicate with each other or work collaboratively as if they are in the same place has been attracting attention. In order to realize this type of technology, an information delivery apparatus (e.g., a delivery server) distributes a plurality of pieces of multimedia data including, for example, video information and audio information to a plurality of user terminals.

For example, in a case where multimedia data is to be distributed to a plurality of user terminals, a method is used in which a delivery server having multimedia data obtained from a video source, such as a video camera, and an audio source, such as a microphone, distributes the data to the user terminals, which have requested the data including, for example, video and audio, based on unicast communication using, for example, a UDP packet.

In such unicast communication, if the number of user terminals requesting the same data increases, the delivery server distributes the data by replicating the same data to numbers equal to the number of unicast communication channels corresponding to the number of users. This may sometimes lead to a waste of network bandwidth.

As a countermeasure against such a situation, JP 2009-542117T discloses a method of avoiding wasteful replication of data by using a broadcast communication channel.

The technology discussed in JP 2009-542117T relates to a disclosure of a method in which, when the delivery server is to distribute the same data to a plurality of user terminals, the delivery server uses a broadcast communication channel instead of unicast communication channels if the number of users requesting the same data is larger than a predetermined threshold value.

As illustrated in FIG. 2, in the method of JP 2009-542117T, a delivery server 201 retaining information to be distributed distributes the information to a plurality of user terminals 202, which receives the information, by using unicast communication channels. For example, if the information is to be distributed to user terminals 202-2 and 202-5, the delivery server 201 distributes the information to the user terminal 202-2 by using a unicast communication channel UC1, and the delivery server 201 distributes the information to the user terminal 202-5 by using a unicast communication channel UC2.

Furthermore, if the number of users that have made information delivery requests is larger than a predetermined threshold value (e.g., threshold value of 4), the delivery server 201 distributes the information to the user terminals 202-1 to 202-5 by switching to a broadcast communication channel BC.

SUMMARY

However, with regard to the technology discussed in JP 2009-542117T, only the concept of the delivery method using unicasting or broadcasting is disclosed. However, there is no description with regard to a specific broadcast-based delivery method, and the disclosure is based on an assumption that there is a broadcast communication channel separately from unicast communication channels.

Furthermore, in this method, the broadcasted data has to be identified whether it is data requested by users by using additional information, such as an additional marker.

Therefore, in a case where an information delivery apparatus is to distribute data, such as video and audio, to a plurality of user terminals, it is desirable to provide an information delivery apparatus, a non-transitory computer-readable storage medium, an information delivery system, a communication terminal that can avoid replication of data in the information delivery apparatus and that also allow the user terminals to receive the data seamlessly between unicasting and broadcasting.

To solve the above issues, the present invention adopts the following configurations.

According to a first embodiment of the present invention, an information delivery apparatus is configured to distribute information to a plurality of communication terminals, the information delivery apparatus including: a terminal-information memory unit for storing terminal information of the plurality of communication terminals serving as information delivery destinations; an address-type-selection-information memory unit for storing address type selection information, which is for selecting an address type, for one network segment or each of a plurality of network segments; a transmission-address determination unit for determining address information to be applied based on the terminal information in the terminal-information memory unit and the address type selection information in the address-type-selection-information memory unit; and a transmission unit for transmitting the information by using the address information determined by the transmission-address determination unit.

According to a second embodiment of the present invention, a non-transitory computer-readable storage medium stores an information delivery program for distributing information to a plurality of communication terminals, the program causing a computer including a terminal-information memory unit for storing terminal information of the plurality of communication terminals serving as information delivery destinations, and an address-type-selection-information memory unit for storing address type selection information, which is for selecting an address type, for one network segment or each of a plurality of network segments, to function as: a transmission-address determination unit for determining address information to be applied based on the terminal information in the terminal-information memory unit and the address type selection information in the address-type-selection-information memory unit; and a transmission unit for transmitting the information by using the address information determined by the transmission-address determination unit.

According to a third embodiment of the present invention, an information delivery system in which an information delivery apparatus distributes information to a plurality of communication terminals. The information delivery apparatus includes a terminal-information memory unit for storing terminal information of the plurality of communication terminals serving as information delivery destinations, an address-type-selection-information memory unit for storing address type selection information, which is for selecting an address type, for one network segment or each of a plurality of network segments, a transmission-address determination unit for determining address information to be applied based on the terminal information in the terminal-information memory unit and the address type selection information in the address-type-selection-information memory unit, and a transmission unit for transmitting the information by using the address information determined by the transmission-address determination unit. Each of the communication terminals includes a reception unit for receiving the information distributed from the information delivery apparatus regardless of the address type of the information.

According to a fourth embodiment of the present invention, a communication terminal is configured to receive information distributed by an information delivery apparatus switching an address type, the communication terminal including: a reception unit for receiving the information distributed from the information delivery apparatus regardless of the address type of the information.

According to a fifth embodiment of the present invention, a non-transitory computer-readable storage medium stores a communication program of a communication terminal for receiving information distributed by an information delivery apparatus switching an address type, the communication program causing a computer to function as: a reception unit for receiving the information distributed from the information delivery apparatus regardless of the address type of the information.

According to the present invention, in the information delivery apparatus, excessive data replication can be avoided and a waste of network bandwidth can be reduced. Furthermore, data can be received seamlessly by each user terminal without being conscious of whether the data is unicasted data or broadcasted data.

BRIEF DESCRIPTION OF THE DRAWINGS

FIG. 4 is a diagram for explaining the configuration of a segment list according to an embodiment.

DETAILED DESCRIPTION OF THE EMBODIMENTS

Figure 1:
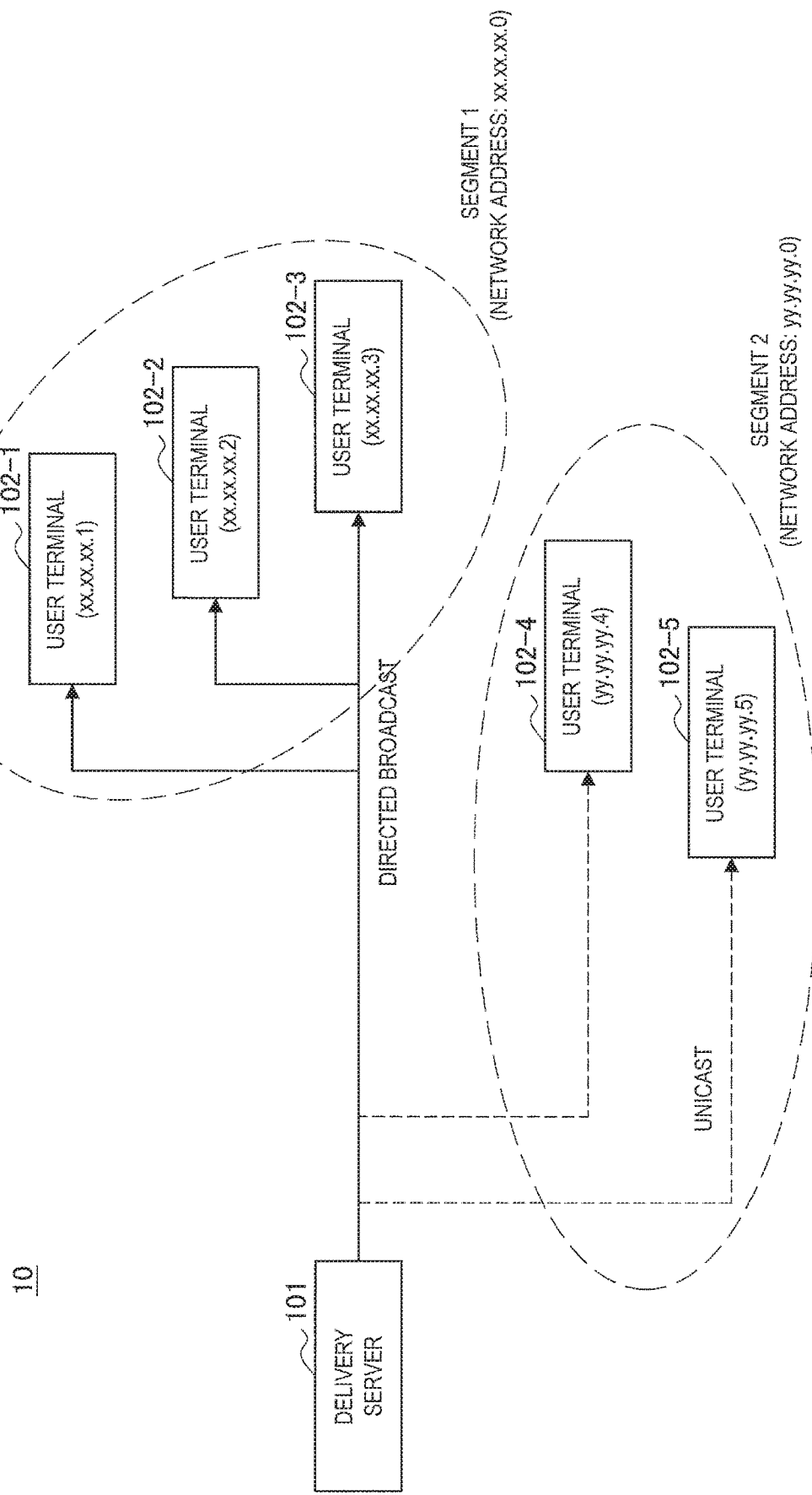
FIG. 1 is an overall configuration diagram illustrating the overall configuration of an information delivery system according to an embodiment.
Figure 2:
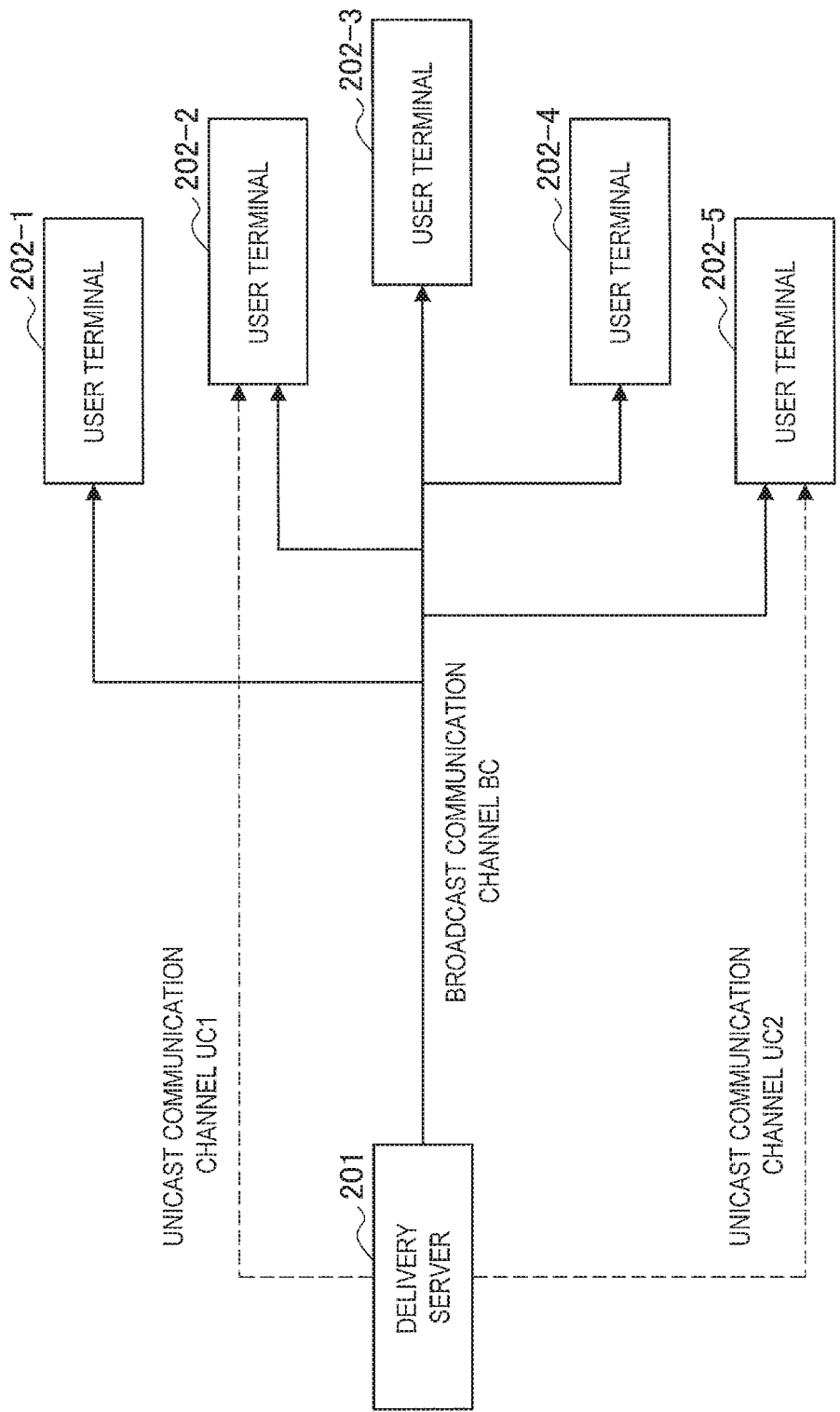
FIG. 2 is a diagram for explaining an information delivery process in the related art.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

(A) Main Embodiment

Embodiments of an information delivery apparatus, an information delivery program, an information delivery system, a communication terminal, and a communication program according to the present invention will be described in detail below with reference to the drawings.

(A-1) Configuration of Embodiment

FIG. 1 is an overall configuration diagram illustrating the overall configuration of an information delivery system 10 according to an embodiment.

In FIG. 1, the information delivery system 10 according to this embodiment includes a delivery server 101 as an information delivery apparatus and a plurality of user terminals 102-1 to 102-5 as communication terminals.

When describing processes and configurations that are common among the user terminals, the user terminals will be expressed as user terminals 102. Although five user terminals 102 are illustrated in FIG. 1, the number of user terminals 102 is not limited thereto.

Furthermore, although only the single delivery server 101 is illustrated in FIG. 1, a plurality of delivery servers 101 may be disposed in a distributed manner. In this case, the plurality of delivery servers 101 may be configured to operate in cooperation with each other to distribute requested multimedia data. For example, the delivery servers 101 may be respectively disposed at a plurality of locations and may be configured to realize communication by distributing information bidirectionally between the locations.

A communication network used in the information delivery system 10 may be, for example, an Internet protocol (IP) network, as typified by, for example, the Internet, or a wide area network, such as a wide-area local area network (LAN) (registered trademark). The communication network may be a wired circuit or a wireless circuit.

The delivery server 101 is configured to distribute, to the user terminals 102 serving as delivery request sources, content data or multimedia information. The content data includes, for example, video and audio, and the multimedia information includes video data and sound data. The video data is obtained from a video source, such as a video camera, and sound data (in this case, the term "sound" is a concept that includes, for example, audio and acoustic) is obtained from an audio (sound-collecting) source, such as a microphone. The delivery server 101 may be configured to acquire video from the camera and audio from the microphone in real time and distribute the video and the audio, or acquire content data or multimedia information from the outside and distribute the content data or the multimedia information to the user terminals 102. As another alternative, the delivery server 101 may be configured to retain content data or multimedia data in, for example, a database and distribute the data to the user terminals 102.

The delivery server 101 receives delivery requests from the user terminals 102 and distributes requested information to the user terminals 102 that have made the delivery requests. When the delivery server 101 is to distribute the information, the delivery server 101 recognizes a network segment to which each user terminal 102 belongs based on address information of the user terminals 102 serving as the delivery request sources. Then, for each network segment, the delivery server 101 compares the number of the user terminals 102 belonging to the network segment with a threshold value. If the number of the user terminals 102 is larger than or equal to the threshold value, the delivery server 101 distributes the information to a directed broadcast address. If the number of the user terminals 102 is smaller than the threshold value, the delivery server 101 distributes the information to the respective user terminals 102 by using unicast addresses.

In other words, in order to reduce the processing load related to data replication in the delivery server 101 and to reduce the number of data replications, when the number of the user terminals 102 is larger than or equal to the threshold value, the delivery server 101 distributes the information to the user terminals 102 belonging to the network segment by using directed broadcasting. To the other user terminals 102, the information is distributed by using unicast addresses.

The user terminals 102 receive the information distributed from the delivery server 101 and, for example, display the video and output the sound. Each user terminal 102 may be, for example, a personal computer, a tablet terminal, a smartphone, or a portable terminal, which is equipped with a communication function. Each user terminal 102 receives the information without distinguishing the address of the information packet received from the delivery server 101 and outputs the information, such as video and sound. Specifically, each user terminal 102 receives packets regardless of a unicast address or a directed broadcast address and can output the data (e.g., video data and sound data) included in the received packets.

Figure 3:
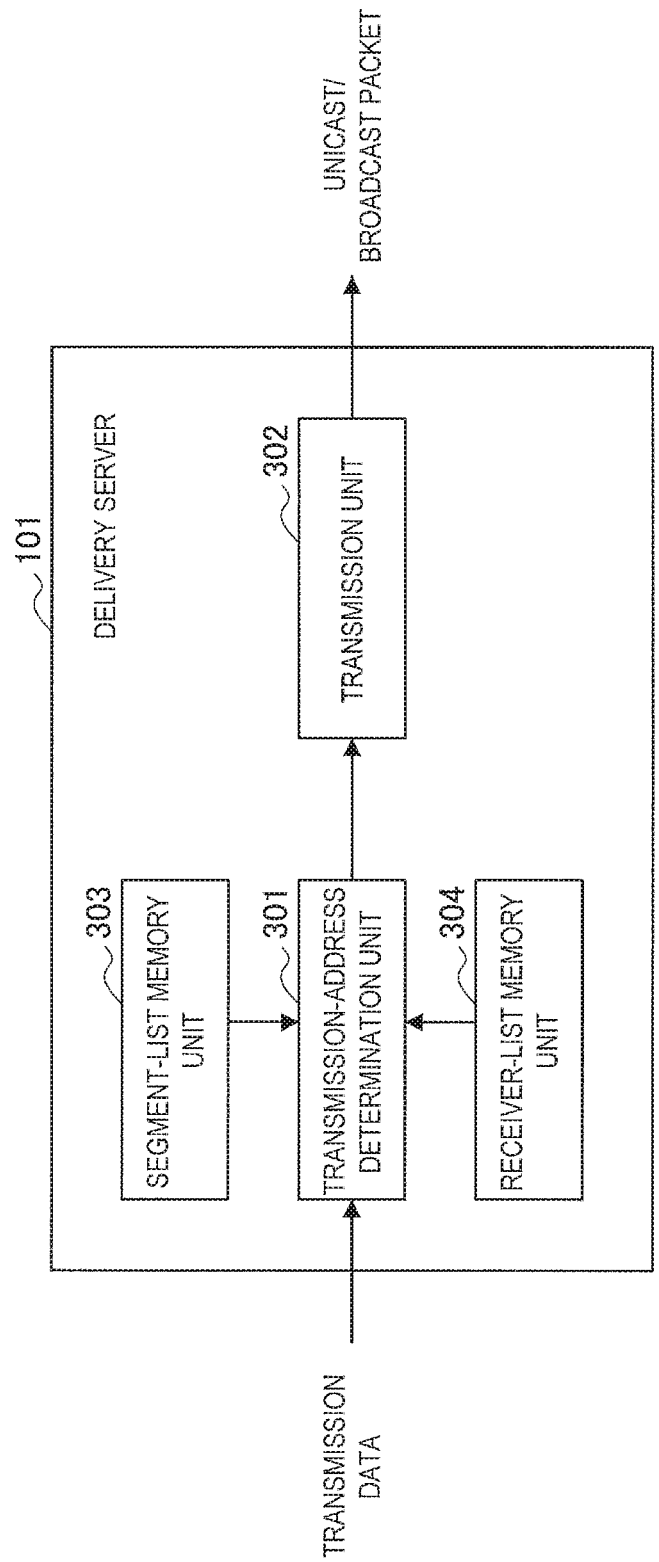
FIG. 3 is an internal configuration diagram illustrating the internal configuration of a delivery server according to an embodiment.

FIG. 3 is an internal configuration diagram illustrating the internal configuration of the delivery server 101 according to the embodiment.

In FIG. 3, the delivery server 101 includes a transmission-address determination unit 301, a transmission unit 302, a segment-list memory unit 303 serving as an address-type-selection-information memory unit, and a receiver-list memory unit 304 serving as a terminal-information memory unit.

Although not illustrated, the hardware configuration of the delivery server 101 may be provided in an already-existing server. For example, a CPU, an external storage device, and a communication device may be provided, and the CPU may execute an information-delivery-process program stored in the storage device so as to realize the function realized by the delivery server 101. Alternatively, the function realized by the delivery server 101 may be established by installing the information-delivery-process program. Even in that case, the information-delivery-process program can be expressed with the process illustrated in FIG. 3.

The receiver-list memory unit 304 is configured to store a unicast address list of user terminals 102 that have made information delivery requests. For example, when the delivery server 101 receives an information delivery request from a user terminal 102, a transmission-source address included in the packet of the information delivery request is extracted and is stored into the receiver-list memory unit 304. Alternatively, transmission-destination address information included in a protocol used for performing signaling of a delivery request is stored into the receiver-list memory unit 304.

To simplify the description in this embodiment, it is assumed that unicast addresses of user terminals 102 serving as transmission destinations (i.e., information delivery request sources) for transmission data, such as certain content data or multimedia data, are made into a list. Of course, if there are a plurality of types of transmission data, such as a plurality of pieces of content data or multimedia data, a list of unicast addresses of user terminals 102 serving as information delivery request sources may be set for each piece of identification information (e.g., content identification information) of the transmission data.

The segment-list memory unit 303 is configured to store a segment list in which a directed broadcast address and a netmask of a network segment, and a threshold value for switching to broadcast delivery are associated for each network segment in which user terminals 102 may exist.

FIG. 4 is a diagram for explaining the configuration of the segment list according to the embodiment. Although FIG. 4 illustrates a case where IP addresses are based on IPv4, the IP addresses can be set based on a concept similar to IPv4 even in a case of IPv6.

As illustrated in FIG. 4, the segment list has a "segment No." item for identifying a network segment, a "broadcast address/netmask" item, and a "threshold value" item.

For example, the directed broadcast address and the netmask for "segment No. 1" is "xx.xx.xx.255/24". Because the netmask is 24, the first 24 bits of a 32-bit IP address correspond to a network address (network section) indicating a network segment, and the last eight bits (from the twenty-fifth bit to the thirty-second bit) correspond to a host address (host section) for identifying user terminals 102 belonging to the network segment. As illustrated in FIG. 4, in a case of directed broadcast, the last eight bits (from the twenty-fifth bit to the thirty-second bit) are "255" in decimal notation and all of the bits are "1" in binary notation. Specifically, the address (directed broadcast address) destined for all user terminals 102 existing in a network segment of "xx.xx.xx.0" is stored.

The "threshold value" is a threshold value for switching to broadcast delivery. This threshold value is to be compared with the number of user terminals 102 that have made information delivery requests in the network segment. The threshold value may be set to an arbitrary value and may vary from network segment to network segment or may be the same value among all of the network segments. When the number of user terminals 102 that have made information delivery requests in the network segment exceeds the threshold value, the corresponding directed broadcast address is used.

For example, when the network segments of the network in which the user terminals 102 requesting for information delivery exist are recognizable in advance, the directed broadcast address of each network segment may be set in the segment list in advance in the segment-list memory unit 303. Alternatively, for example, when the delivery server 101 receives information delivery requests, the directed broadcast address of the network segment in which the user terminals 102 serving as request sources exist may be generated based on the IP addresses included in the received information delivery requests and be set in the segment list.

When the transmission-address determination unit 301 acquires transmission data, such as content data or multimedia data, to be transmitted to the user terminals 102, the transmission-address determination unit 301 reads, from the receiver-list memory unit 304, the unicast addresses of the user terminals 102 serving as the delivery request sources of the relevant transmission data. Based on the unicast addresses read from the receiver-list memory unit 304, the transmission-address determination unit 301 calculates the number of user terminals 102 in each network segment (the number of addresses in each network segment to be precise).

The transmission-address determination unit 301 refers to the segment-list memory unit 303 and compares the number of user terminals 102 in each network segment with the threshold value for the corresponding network segment.

Then, if the number of user terminals 102 requesting for information delivery is larger than or equal to the threshold value, the transmission-address determination unit 301 determines that the delivery to the user terminals 102 existing in the network segment is to be performed by using a directed broadcast address. Specifically, if the number of user terminals 102 set in the segment list exceeds the threshold value for the corresponding network segment, a directed broadcast address is used for these user terminals 102 so that the processing load related to replication of the transmission data and the number of replications can be reduced.

In contrast, if the number of user terminals 102 requesting for information delivery is smaller than the threshold value, the transmission-address determination unit 301 determines that the delivery to the respective user terminals 102 is to be performed by using unicast addresses.

If there are a plurality of types of transmission data, the transmission-address determination unit 301 may refer to identification information of the transmission data and refer to the receiver list set for each piece of identification information of the transmission data so as to confirm the number of transmission destinations (i.e., the number of delivery destinations) for the transmission data.

The transmission unit 302 transmits the transmission data by using the address (unicast addresses or directed broadcast address) determined by the transmission-address determination unit 301. The transmission unit 302 replicates transmission data to required numbers in accordance with the number of delivery destinations by using the determination result obtained by the transmission-address determination unit 301.

(A-2) Operation According to Embodiment

Next, the operation of a process in the information delivery system 10 according to this embodiment will be described with reference to the drawings.

Figure 5:
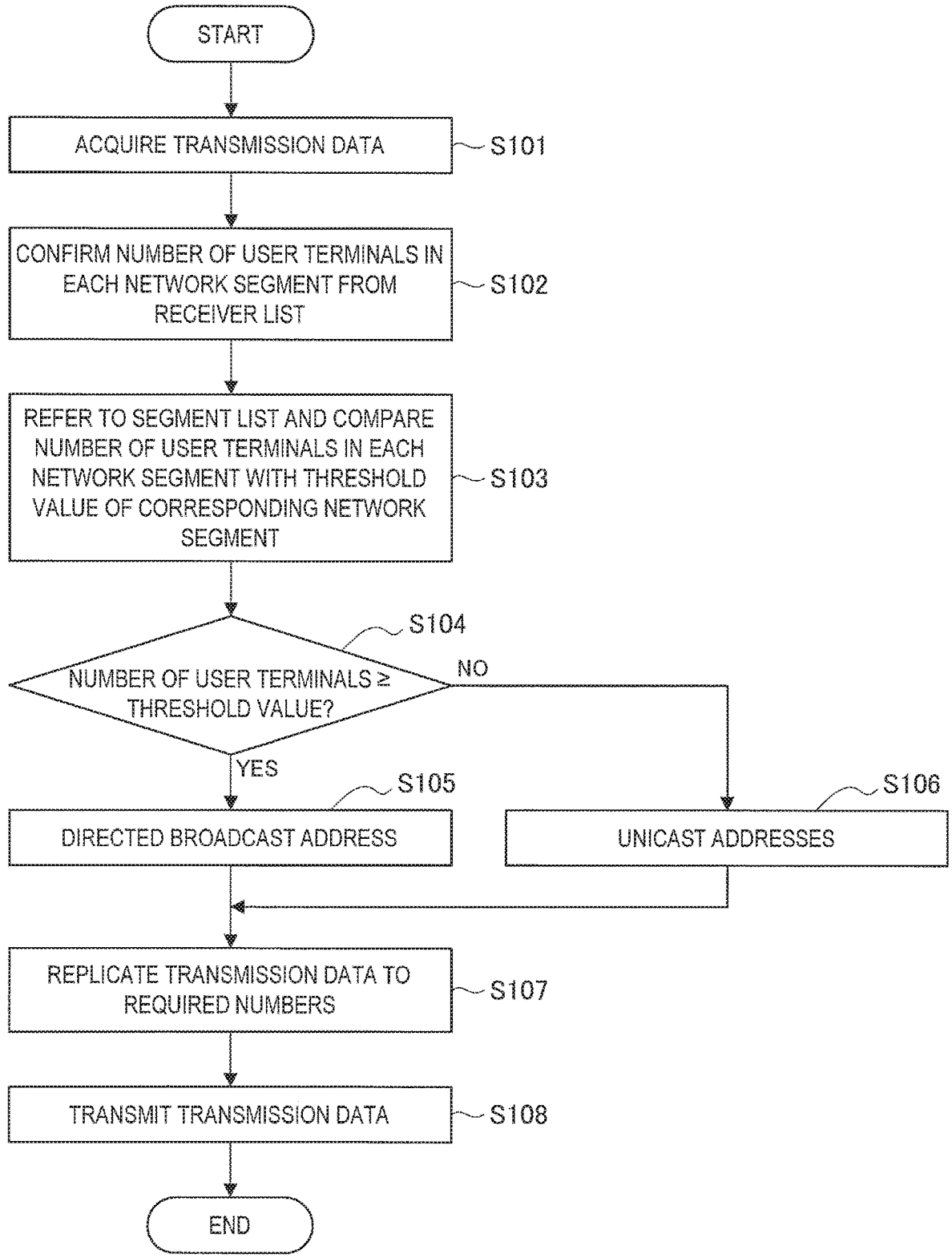
FIG. 5 is a flowchart illustrating a process performed in a delivery server of an information delivery system according to an embodiment.

FIG. 5 is a flowchart illustrating a process performed in the delivery server 101 of the information delivery system 10 according to the embodiment.

In FIG. 1, the user terminals 102-1 to 102-5 make information delivery requests to the delivery server 101.

It is assumed that the user terminals 102-1 to 102-3 belong to a network segment 1 (network address: "xx.xx.xx.0"), the IPv4-based IP addresses of the user terminals 102-1 to 102-3 are "xx.xx.xx.1", "xx.xx.xx.2", and "xx.xx.xx.3", respectively, and their netmasks are a 24-bit prefix.

Furthermore, it is assumed that the user terminals 102-4 and 102-5 belong to a network segment 2 (network address: "yy.yy.yy.0"), the IPv4-based IP addresses of the user terminals 102-4 and 102-5 are "yy.yy.yy.4" and "yy.yy.yy.5", respectively, and their netmasks are a 24-bit prefix.

Although the description here relates to an example that uses the IPv4 protocol and the UDP packet, a similar process is possible in a case where other network layer protocols, such as IPv6, are used or in a case where a transport layer protocol other than the UDP packet is used.

When the delivery server 101 receives delivery requests from the user terminals 102-1 to 102-5, the delivery server 101 distributes requested transmission data to the user terminals 102-1 to 102-5.

It is assumed that in the receiver list stored in the receiver-list memory unit 304 of the delivery server 101, "xx.xx.xx.1", "xx.xx.xx.2", "xx.xx.xx.3", "yy.yy.yy.4", and "yy.yy.yy.5" have been set with respect to the transmission data to be distributed this time.

Moreover, it is assumed that in the segment list stored in the segment-list memory unit 303 of the delivery server 101, the list illustrated in FIG. 4 has been set.

In the delivery server 101, the transmission data requested to be distributed is provided to the transmission-address determination unit 301 (S101).

The transmission-address determination unit 301 reads, from the receiver-list memory unit 304, the unicast addresses of the user terminals 102 that have made the requests for delivery of the transmission data and confirms the number of user terminals 102 in each network segment (S102).

For example, in the receiver list stored in the receiver-list memory unit 304, "xx.xx.xx.1", "xx.xx.xx.2", "xx.xx.xx.3", "yy.yy.yy.4", and "yy.yy.yy.5" have been set with respect to the transmission data to be distributed this time. Therefore, the transmission-address determination unit 301 confirms that three addresses belonging to the network segment 1 are "xx.xx.xx.1", "xx.xx.xx.2", and "xx.xx.xx.3", and two addresses belonging to the network segment 2 are "yy.yy.yy.4" and "yy.yy.yy.5".

Subsequently, the transmission-address determination unit 301 refers to the segment-list memory unit 303 and compares the number of user terminals in each network segment with the threshold value of the corresponding network segment (S103).

Then, if the number of user terminals in each network segment is larger than or equal to the threshold value (S104), a directed broadcast address is used for the user terminals 102 belonging to the network segment (S105).

In contrast, if the number of user terminals in each network segment is smaller than the threshold value (S104), unicast addresses are used for the respective user terminals 102 (S106).

For example, as described above, in the addresses, which have been read from the receiver list, of the delivery destinations for the relevant transmission data, the three addresses belonging to the network segment 1 are "xx.xx.xx.1", "xx.xx.xx.2", and "xx.xx.xx.3". A "threshold value: 3" is set for the network segment 1 of the segment list illustrated in FIG. 4. Therefore, the number of user terminals in the network segment 1 is larger than or equal to the threshold value. Thus, the transmission-address determination unit 301 reads a directed broadcast address from the segment list in FIG. 4 and uses the directed broadcast address "xx.xx.xx.255" for the user terminals 102-1 to 102-3 belonging to the network segment 1.

Furthermore, for example, the two addresses belonging to the network segment 2 are "yy.yy.yy.4" and "yy.yy.yy.5". A "threshold value: 3" is set for the network segment 2 of the segment list illustrated in FIG. 4. Therefore, the number of user terminals in the network segment 2 is smaller than the threshold value. Thus, the transmission-address determination unit 301 uses the unicast addresses "yy.yy.yy.4" and "yy.yy.yy.5" for the user terminals 102-4 and 102-5 belonging to the network segment 2.

The transmission unit 302 replicates the transmission data in accordance with the number of addresses to which the transmission data is to be transmitted and which have been generated by the transmission-address determination unit 301 (S107). Then, the addresses (i.e., the directed broadcast address and the unicast addresses) determined by the transmission-address determination unit 301 are added to the transmission data, which is then transmitted (S108).

For example, in steps S104 to S106, the transmission-address determination unit 301 has determined three addresses that are "yy.yy.yy.4", "yy.yy.yy.5" and the directed broadcast address "xx.xx.xx.255". Therefore, the transmission unit 302 replicates the transmission data to obtain three pieces of transmission data, adds the addresses, to which the respective pieces of transmission data are to be transmitted, to the respective pieces of transmission data, and transmits the pieces of transmission data.

Although the above description relates to the example in which an address for each piece of transmission data is determined as in FIG. 5, a transmission address list obtained by performing the process in steps S102 to S106 only when there is a change in the receiver list may be determined, and the transmission process may be performed by referring only to this transmission address list when each piece of data is to be transmitted.

(A-3) Advantages of Embodiment

As described above, the following advantages are achieved in accordance with this embodiment.

With respect to a network segment where there are transmission requests from user terminals larger than or equal to a threshold value, the delivery server simply transmits a packet to a directed broadcast address instead of replicating the transmission data into packets and transmitting the packets to individual unicast addresses, so that excessive data replication can be avoided and a waste of network bandwidth can be reduced.

Furthermore, each user terminal can seamlessly receive data without being conscious of whether the data is unicasted data or broadcasted data.

(B) Other Embodiments

Although various modified embodiments have been mentioned in the above-described embodiment, hereinafter, other modified embodiments of the present invention will be described.

(B-1) In the above-described embodiment, if a network segment in which user terminals assumed as delivery destinations may exist can be identified in advance, a list for each network segment is listed, like the segment list in FIG. 4.

However, for example, if there is not enough room in the segment list for listing network segments, it may also be assumed that there may be requests from user terminals belonging to a network segment not set in the segment list. In this case, for example, a preset threshold value and a preset netmask may be set in addition to the segment list in FIG. 4. Specifically, a default threshold value and a default netmask may be set. For example, with regard to a unicast address belonging to a network segment not listed in the segment list, an address determination process may be performed assuming that there is an entry in the segment list in which the broadcast address derived from the preset netmask and the corresponding preset threshold value have been set.

For example, it is assumed that a preset threshold value 5 and a 24-bit prefix as a preset netmask are set as default. It is assumed that there is a unicast address "zz.zz.zz.6" whose entry is not in the segment list in FIG. 4. A network segment of a network address "zz.zz.zz.0" and a broadcast address "zz.zz.zz.255" are derived from the unicast address "zz.zz.zz.6" and the preset netmask of "24". If the number of delivery requests in the "zz.zz.zz" network segment is larger than or equal to the "threshold value 5", the delivery server distributes information by using the broadcast address "zz.zz.zz.255". Accordingly, a process similar to the case where entries of the broadcast address "zz.zz.zz.255/24" and the "threshold value 5" exist in the segment list can be performed. If the number of delivery requests from the network segment of the network address "zz.zz.zz.0" is smaller than the threshold value 5, transmission is performed by unicasting.

(B-2) In the above-described embodiment, the user terminals 102-1 to 102-3 among the user terminals 102 receive packets destined for a directed broadcast address instead of unicast addresses. However, the user terminals 102 wait for reception of packets without specifying the reception addresses and perform processing while neglecting the actual reception addresses of the received packets so that data can be received seamlessly without having to distinguish between a case where the data is received via unicast addresses and a case where the data is received via a broadcast address.

(B-3) In a case where a plurality of pieces of data with different contents, such as video and audio, are to be simultaneously distributed (i.e., in a case where media data that varies from application to application is to be received), for example, if UDP is to be used, the types of data to be received may be specified by, for example, setting UDP port numbers as the items of the segment list and the receiver list. Moreover, in addition to reception port numbers, the IP address or the port number of the transmission source may be used for the determination of the types of data.

For example, with regard to the entries in the segment list in FIG. 4, the segment list may include information about a port number of a transport layer stored as a key in addition to the broadcast address. The receiver list includes combinations of unicast addresses of the receivers (user terminals) and reception port numbers. Specifically, even when user terminals have the same broadcast address, if the port numbers are different therebetween, packets are transmitted as different packets.

According to the process described above, information is distributed to the receivers in the receiver list not always by unicasting but by selectively using broadcasting.

(B-4) The present invention is not limited to the above embodiments and can be applied to other various types of information delivery apparatuses.

For example, the embodiments of the present invention can be used for distributing various types of data, such as distributing, for example, text information or presentation information other than video and audio data, as in a multi-point conference system.

Furthermore, for example, the protocol to be used is not limited to a specific protocol, such as IPv4 or UDP, and the embodiments of the present invention is applicable to various types of information delivery systems that use, for example, other types of network protocols and transport protocols, such as IPv6.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:
1. An information delivery apparatus for distributing information to a plurality of communication terminals, the information delivery apparatus comprising: a terminal-information memory unit for storing terminal information of the plurality of communication terminals serving as information delivery destinations, the terminal information including a unicast IP address for each of the plurality of communication terminals; an address-type-selection-information memory unit for storing address-type selection information, which is for selecting an IP address type from among a broadcast address type and a unicast address type, for a plurality of IP network segments, the address-type selection information including, for each of the plurality of IP network segments, at least a broadcast IP address and a threshold value for switching from a unicast-type transmission to a broadcast-type transmission, wherein a predetermined group of bits of each broadcast IP address defines a network segment, such that different bit values in the predetermined group of bits correspond to different IP network segments; a transmission-address determination unit for receiving transmission data to transmit to one or more of the plurality of communication terminals, and for determining address information to be applied, among the broadcast IP address and one or more unicast addresses of the plurality of communication terminals, based on the terminal information in the terminal-information memory unit and the address-type selection information in the address-type-selection-information memory unit; and a transmission unit for transmitting the transmission data by using the address information determined by the transmission-address determination unit, wherein, after receiving the transmission data, the transmission-address determination unit determines whether to use the one or more unicast IP addresses or the broadcast IP address for transmission by the transmission unit for each of the IP network segments by operations including reading, from the terminal-information memory unit, unicast addresses of communication terminals, among the plurality of communication terminals, serving as delivery request sources corresponding to the transmission data, to obtain the terminal information, based on the reading of the unicast addresses, and referring to the address-type-selection-information memory unit for the address-type selection information, calculating a number of the communication terminals among the plurality of communication terminals corresponding to a number of transmission destinations in each of the IP network segments, and comparing the threshold value for each of the IP network segments with the number of transmission destinations in each of the IP network segments, the number of transmission destinations having been derived based on the terminal information and the address-type selection information, wherein if the transmission-address determination unit determines, based on the comparing resulting in an indication that the number of transmission destinations is greater than the threshold value, that the broadcast IP address is to be used for transmission by the transmission unit, the transmission unit transmits the transmit data in a network layer to an IP network segment of the different IP network segments corresponding to the predetermined group of bits using directed broadcasting, and transmits the transmit data to others of the different IP network segments using unicast addresses, and wherein if the transmission-address determination unit determines, based on the comparing resulting in an indication that the number of transmission destinations is smaller than the threshold value, the transmission unit transmits the transmit data to the plurality of communication terminals using the one or more unicast IP addresses; wherein the transmission unit replicates the transmission data in accordance with a number of addresses to which the transmission data is to be transmitted and which have been generated by the transmission-address determination unit, to transmit the replicated transmission data using directed broadcasting to respective different addresses of the plurality of IP network segments.

2. The information delivery apparatus according to claim 1,
wherein the address-type-selection-information memory unit stores, in addition to a broadcast IP address for each IP network segment, a default threshold value and a default netmask for the IP network segment that is not registered, and
wherein the transmission-address determination unit determines a unicast IP address or the broadcast IP address for each of the IP network segments with respect to address information of a transmission destination belonging to the IP network segment that is not registered in the address-type-selection-information memory unit in accordance with a number of transmission destinations in the IP network segment that is not registered, the number of transmission destinations in the IP network segment that is not registered having been calculated by using the default threshold value and the default netmask.

3. The information delivery apparatus according to claim 1,
wherein the address-type-selection-information memory unit stores information also including a port number as the address-type selection information,
wherein the terminal-information memory unit stores information also including a reception port number as the terminal information, and
wherein the transmission unit transmits the information by using the address information determined by the transmission-address determination unit and the port number.

4. The information delivery apparatus according to claim 1, wherein the information includes video information.

5. The information delivery apparatus according to claim 1, wherein the information includes sound information.

6. A non-transitory computer-readable storage medium storing an information delivery program for distributing information to a plurality of communication terminals, the program causing a computer including a terminal-information memory unit for storing terminal information of the plurality of communication terminals serving as information delivery destinations, the terminal information including a unicast IP address for each of the plurality of communication terminals, and an address-type-selection-information memory unit for storing address-type selection information, which is for selecting an IP address type from among a broadcast address type and a unicast address type, for a plurality of IP network segments, the address-type selection information including, for each of the plurality of IP network segments, at least a broadcast IP address and a threshold value for switching from a unicast-type transmission to a broadcast-type transmission, wherein a predetermined group of bits of each broadcast IP address defines a network segment, such that different bit values in the predetermined group of bits correspond to different IP network segments, to function as: a transmission-address determination unit for receiving transmission data to transmit to one or more of the plurality of communication terminals, and for determining address information to be applied, among the broadcast IP address and one or more unicast IP addresses of the plurality of communication terminals, based on the terminal information in the terminal-information memory unit and the address type selection information in the address-type-selection-information memory unit; and a transmission unit for transmitting the transmission data by using the address information determined by the transmission-address determination unit, wherein the transmission-address determination unit determines, after receiving the transmission data, whether to use the one or more unicast IP addresses or the broadcast IP address for transmission by the transmission unit for each of the IP network segments by operations including reading, from the terminal-information memory unit, unicast addresses of communication terminals, among the plurality of communication terminals, serving as delivery request sources corresponding to the transmission data, to obtain the terminal information, based on the reading of the unicast addresses, and referring to the address-type-selection-information memory unit for the address-type selection information, calculating a number of the communication terminals among the plurality of communication terminals corresponding to a number of transmission destinations in each of the IP network segments, and comparing the threshold value for each the respective IP network segments with a number of transmission destinations in each of the respective IP network segments, the number of transmission destinations having been derived based on the terminal information and the address-type selection information, wherein if the transmission-address determination unit determines, based on the comparing resulting in an indication that the number of transmission destinations is greater than the threshold value, that the broadcast IP address is to be used for transmission by the transmission unit, the transmission unit transmits the transmit data in a network layer to an IP network segment of the different IP network segments corresponding to the predetermined group of bits using directed broadcasting, and transmits the transmit data to others of the different IP network segments using unicast addresses, and wherein if the transmission-address determination unit determines, based on the comparing resulting in an indication that the number of transmission destinations is smaller than the threshold value, the transmission unit transmits the transmit data in the network layer to the plurality of communication terminals using the one or more unicast IP addresses; wherein the transmission unit replicates the transmission data in accordance with a number of addresses to which the transmission data is to be transmitted and which have been generated by the transmission-address determination unit, to transmit the replicated transmission data using directed broadcasting to respective different addresses of the plurality of IP network segments.

7. An information delivery system in which an information delivery apparatus distributes information to a plurality of communication terminals, wherein the information delivery apparatus includes a terminal-information memory unit for storing terminal information of the plurality of communication terminals serving as information delivery destinations, the terminal information including a unicast IP address for each of the plurality of communication terminals, an address-type-selection-information memory unit for storing address-type selection information, which is for selecting an IP address type from among a broadcast address type and a unicast address type, for a plurality of IP network segments, the address-type selection information including, for each of the plurality of IP network segments, at least a broadcast IP address and a threshold value for switching from a unicast-type transmission to a broadcast-type transmission, wherein a predetermined group of bits of each broadcast IP address defines a network segment, such that different bit values in the predetermined group of bits correspond to different IP network segments, a transmission-address determination unit for receiving transmission data to transmit to one or more of the plurality of communication terminals, and for determining address information to be applied, among the broadcast IP address and one or more unicast IP addresses of the plurality of communication terminals, based on the terminal information in the terminal-information memory unit and the address-type selection information in the address-type-selection-information memory unit, and a transmission unit for transmitting the transmission data by using the address information determined by the transmission-address determination unit, and wherein each of the communication terminals includes a reception unit for receiving the transmission data distributed from the information delivery apparatus without distinguishing an address type, among the broadcast address type and the unicast address type, of the information, and wherein the transmission-address determination unit determines, after receiving the transmission data, whether to use the one or more unicast IP addresses or the broadcast IP address for transmission by the transmission unit for each of the IP network segments by operations including reading, from the terminal-information memory unit, unicast addresses of communication terminals, among the plurality of communication terminals, serving as delivery request sources corresponding to the transmission data, to obtain the terminal information, based on the reading of the unicast addresses, and referring to the address-type-selection-information memory unit for the address-type selection information, calculating a number of the communication terminals among the plurality of communication terminals corresponding to a number of transmission destinations in each of the IP network segments, and comparing the threshold value for each of the respective IP network segments with a number of transmission destinations in each of the respective IP network segments, the number of transmission destinations having been derived based on the terminal information and the address-type selection information, wherein if the transmission-address determination unit determines, based on the comparing resulting in an indication that the number of transmission destinations is greater than the threshold value, that the broadcast IP address is to be used for transmission by the transmission unit, the transmission unit transmits the transmit data in a network layer to an IP network segment of the different IP network segments corresponding to the predetermined group of bits using directed broadcasting, and transmits the transmit data to others of the different IP network segments using unicast addresses, and wherein if the transmission-address determination unit determines, based on the comparing resulting in an indication that the number of transmission destinations is smaller than the threshold value, the transmission unit transmits the transmit data in the network layer to the plurality of communication terminals using the one or more unicast IP addresses; wherein the transmission unit replicates the transmission data in accordance with a number of addresses to which the transmission data is to be transmitted and which have been generated by the transmission-address determination unit, to transmit the replicated transmission data using directed broadcasting to respective different addresses of the plurality of IP network segments.

8. A communication terminal for receiving information distributed by the information delivery apparatus of claim 1, the communication terminal comprising:
a reception unit for receiving the transmission data distributed from the information delivery apparatus without distinguishing an address type, among the unicast address type and the broadcast address type, of the information.

9. The communication terminal according to claim 8, wherein the reception unit receives the transmission data by distinguishing a transmission-source address added to the received information.

10. The communication terminal according to claim 8, wherein the reception unit receives the transmission data by distinguishing a port number added to the received information.

11. A non-transitory computer-readable storage medium storing a communication program of a communication terminal for receiving information distributed by the information delivery apparatus of claim 1, the communication program causing a computer to function as:
- a reception unit for receiving the transmission data distributed from the information delivery apparatus without distinguishing an address type, among the unicast address type and the broadcast address type, of the information.

12. The communication terminal for receiving information distributed by the information delivery apparatus of claim 1, wherein the address-type-selection-information memory unit stores address-type selection information for the plurality of network segments,
- the address-type selection information for each of the plurality of IP network segments includes a segment number of each IP network segment, a netmask associated with each IP network segment, and
- wherein each netmask includes a first portion corresponding to a network address of a respective IP network segment, different from the network address of each other IP network segment, and a second portion for identifying one or more user terminals in the respective IP network segment.

* * * * *